I. SIMPSON.
RECORDING DEVICE.
APPLICATION FILED JULY 19, 1913.
1,206,040.
Patented Nov. 28, 1916.
2 SHEETS—SHEET 1.
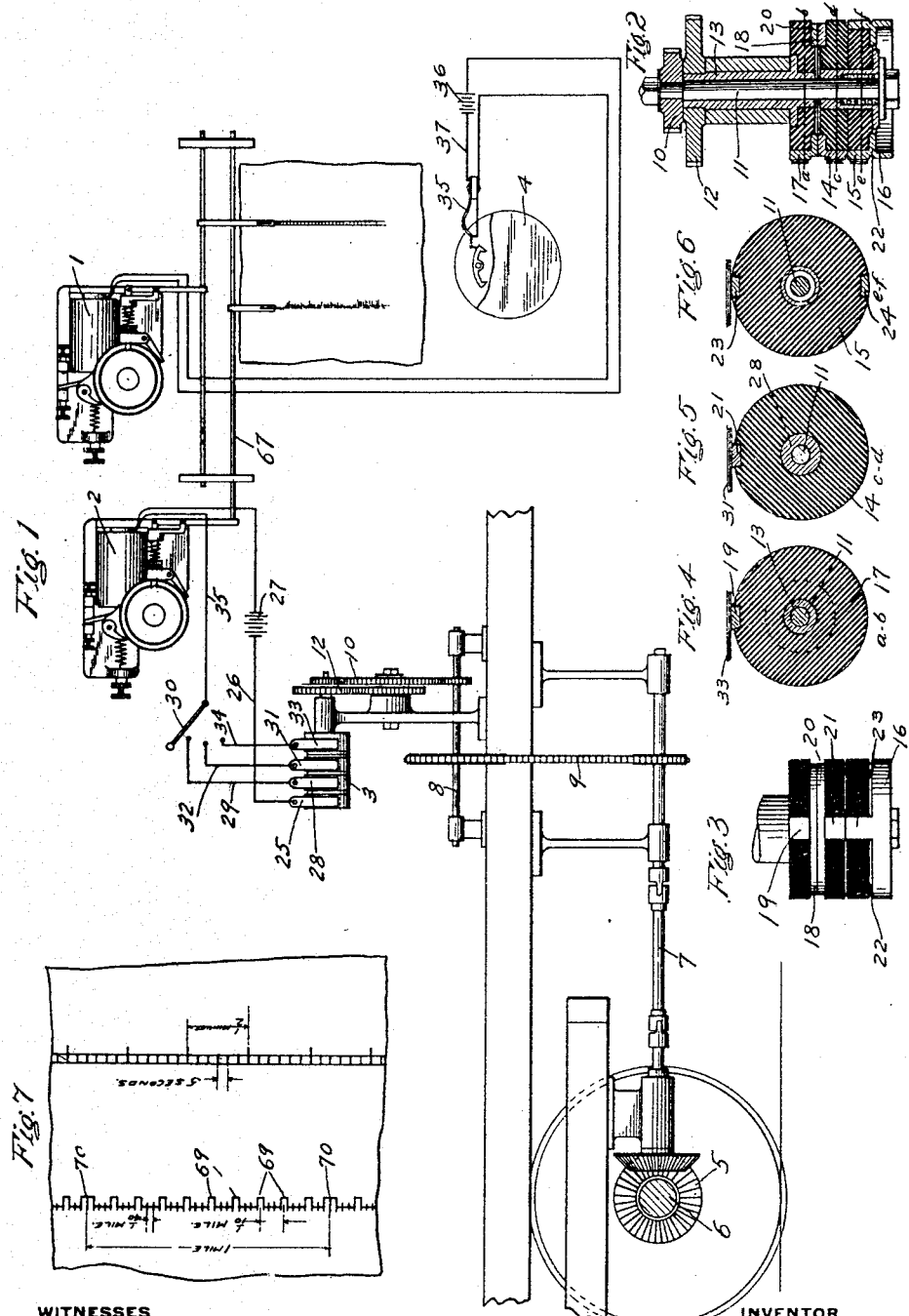
WITNESSES
INVENTOR
Isaac Simpson
by Wm. H. Cady
Atty.

I. SIMPSON.
RECORDING DEVICE.
APPLICATION FILED JULY 19, 1913.
1,206,040.
Patented Nov. 28, 1916.
2 SHEETS—SHEET 2.
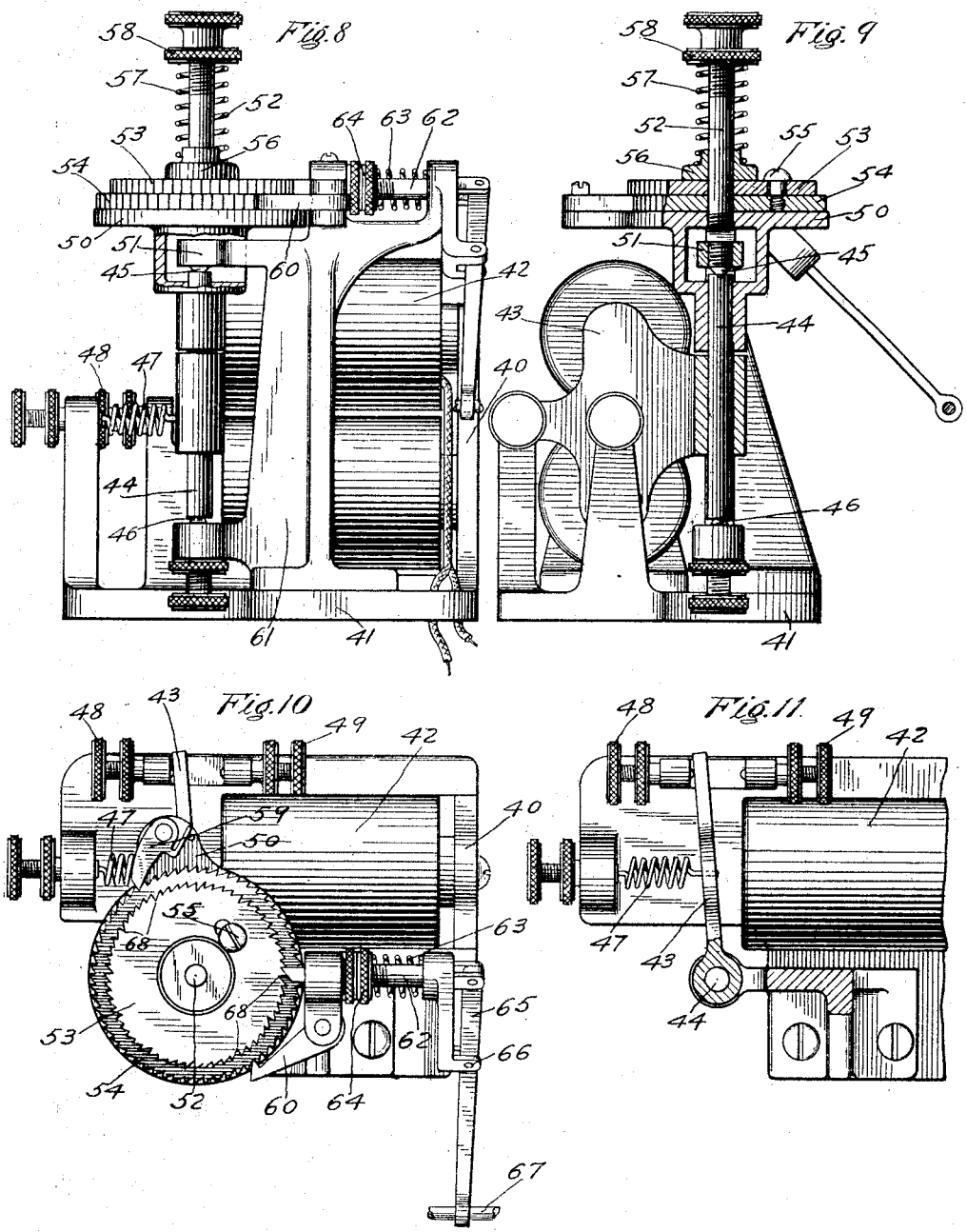
WITNESSES
INVENTOR
Isaac Simpson
by Wm. M. Cady
Att'y.

UNITED STATES PATENT OFFICE.

ISAAC SIMPSON, OF EDGEWOOD, PENNSYLVANIA.

RECORDING DEVICE.

1,206,040.  Specification of Letters Patent.  Patented Nov. 28, 1916.

Application filed July 19, 1913. Serial No. 779,913.

*To all whom it may concern:*

Be it known that I, ISAAC SIMPSON, a citizen of the United States, residing at Edgewood, in the county of Allegheny and State of Pennsylvania, have invented new and useful Improvements in Recording Devices, of which the following is a specification.

This invention relates to recording apparatus, more particularly as employed on dynamometer cars for securing graphical records of various movements having a bearing on the running of railway trains.

One object of my invention is to provide an improved electric controlling instrument which is accurate and positive in action.

Another object of my invention is to provide a generally improved recording apparatus.

In the accompanying drawings, Figure 1 is a diagrammatic view of a dynamometer car recording apparatus, showing my improvements embodied therein; Fig. 2 a central sectional view of the commutator for controlling the current supply to the recording instrument; Fig. 3 a side elevation thereof; Fig. 4 a transverse section thereof on the line a—b of Fig. 2; Fig. 5 a transverse section on line c—d; Fig. 6 a transverse section on the line e—f; Fig. 7 a plan view of a portion of the record sheet; Fig. 8 a front elevation of an electric recording instrument embodying my improvements; Fig. 9 a side elevation thereof, partly in section; Fig. 10 a top plan view thereof; and Fig. 11 a top plan view, partly in section.

In Fig. 1 of the drawings a diagrammatic illustration of a recording apparatus for a dynamometer car is shown with an electric time recording instrument 1 and an electric distance recording instrument 2 connected up. In practice, a larger number of recording instruments are usually employed, but so far as the present invention is concerned, it will be sufficient to illustrate the operation of the two above indicated.

The electric circuit of the distance recording instrument 2 is preferably controlled by a commutator 3 and the circuit of the time recorder 1 is controlled by a suitable clock mechanism 4. The commutator 3 is rotated by operatively connecting the same to a car axle. As shown in the drawing, bevel gears 5 transmit the movement of the car axle 6 to a flexible shaft 7 which is operatively connected to a countershaft 8 by means of sprocket wheels and chain 9. One train of gears 10 transmits motion from the countershaft 8 to a small commutator shaft 11 and another train of gears 12 to a sleeve commutator shaft 13. The small shaft 11 carries the commutator sections 14, 15, and 16 and the sleeve shaft 13 carries the commutator section 17. The commutator section 17 is made of insulating material and carries a metal contact ring 18 having a single raised contact 19, the section 14 carries ring 20 having contact 21, and section 15 carries ring 22 having two raised contacts 23 and 24. The section 16 is a continuous contact ring formed integral with ring 22.

Four commutator brushes are provided, and the brush 25 engages contact ring 16 and is connected to circuit wire 26 having a source of current 27 and connected to the electromagnet of the distance recording instrument 2. Brush 28 engages contacts 23 and 24 and is connected to wire 29 having a terminal controlled by a switch 30, brush 31 engages contact 21 and connects with wire 32, and brush 33 engages contact 19 and is connected to wire 34. The switch 30 is connected to wire 35 leading to the other terminal of the distance instrument electromagnet and the circuit is completed through any one of the wires 29, 32, or 34 according to the position of the switch 30. The purpose of the commutator 3 is to provide for recording different distance intervals and for the purpose of illustration, the train of gearing 10 is proportioned to rotate the small commutator shaft at such a speed relative to the travel of the car wheel on the rail that the single contact 21 closes the circuit through brush 31 for intervals of fifty feet while the two contacts 23 and 24 close the circuit through brush 28 for intervals of twenty-five feet. The other train of gears 12 is so arranged that the sleeve shaft 13 and the contact 19 rotate at such speed that the circuit is closed through brush 33 at intervals of one-fortieth of a mile.

The circuit of the time recording instrument 1 is controlled by a suitable switch 35 which may be opened and closed by the operation of a clock escapement or otherwise and a source of current 36 is connected up in the time circuit wire 37. The time electric circuit may be closed at any desired time intervals, but in illustrating the invention, it is assumed that the clock mechanism 4 is arranged to close the circuit at intervals of five seconds.

A description of the construction and operation of the electric recording instruments will now be given, referring particularly to Figs. 8 to 11 inclusive of the drawings. Mounted on a standard 40 secured to base plate 41 are the coils of an electro-magnet 42 and the armature plate 43 thereof is carried by a vertical shaft 44 mounted between conical bearings 45 and 46, the lower bearing 46 being made adjustable so as to take up lost motion. The electro-magnet 42 tends to move the armature 43 in one direction and an adjustable coil spring 47 in the opposite direction. Adjusting screws 48 and 49 are provided for regulating the extent of movement of the armature. Secured to the upper end of the shaft 44 is a horizontal circular table 50 having a recess into which an arm 51 extends for supporting the upper conical bearing on the shaft 44. On the table 50 is a central pin 52 upon which are mounted ratchet wheels 53 and 54, the ratchet wheel 54 bearing on the surface of the table 50 and the ratchet wheel 53 being secured to the ratchet wheel 54 by a screw 55. A spring washer 56 bears against the upper face of the ratchet wheel 53 and is subject to the pressure of a coil spring 57, the tension of which is adapted to be adjusted by means of a nut 58. The table 50 reciprocates with the armature 43 and pivoted thereto is a ratchet pawl 59 adapted to engage the teeth of ratchet wheel 54. A holding ratchet pawl 60 is pivoted to a standard 61 mounted on the base plate 41 and is also adapted to engage the teeth of ratchet wheel 54. A reciprocating ratchet bar 62 mounted in bearings in the standard 61 engages the teeth of ratchet wheel 53, said bar being acted upon by a coil spring 63 through an adjustable nut 64 on the bar, so that the bar is maintained in yielding engagement with the ratchet teeth of the wheel 53. The outer end of the ratchet bar 62 is pivotally connected to an arm 65 fulcrumed at 66, said arm being operatively connected at its opposite end to a sliding bar 67, shown in Fig. 1, for actuating the recording stylus.

In order to indicate greater intervals than the unit intervals for which the teeth of the ratchet wheel 53 are designed, periodical notches 68 of the wheel are made deeper than the other notches so that when the ratchet bar 62 engages a periodical notch the movement of the ratchet bar will be greater than the movement of same in engaging the other notches and consequently the recording stylus will make a mark longer than the unit marks so that the same may be readily distinguished from the unit marks. The ratchet wheel 53, as shown in Fig. 10, is cut for recording time intervals and is illustrated with every sixth notch cut deeper than the unit notches. If the unit notches represent five seconds of time, then the deep notches will indicate every one-half minute. In a similar manner, the ratchet wheel employed on the distance recording instrument may be provided with periodical deep notches. For example, if the unit notches in the wheel each represent one-fortieth of a mile, the deep notches may be arranged at every fourth notch, so that the long marks, as indicated at 69 in Fig. 7 will represent tenths of a mile. Furthermore, mile distances may be indicated by cutting two deep notches in succession at every ten of the notches 69, the record made being shown at 70 in Fig. 7. The paper upon which the record is made is arranged to travel at a rate of speed proportional to the speed of the vehicle and means may be provided whereby the relative speed may be adjusted as desired, so that the spacing of the recorded marks will be a sufficient distance apart to permit of reading the same with the desired facility. A variety of ratchet wheels 53 with different arrangements of deep notches are provided, so that the record may be made to indicate any desired spacing by changing the ratchet wheel employed.

In operation, having applied the ratchet wheels 53 to the various recording instruments in use for the desired records, the switch 30 is moved to close the distance electric circuit through one of the connections 29, 32, or 34, according to the distance indication desired. Upon movement of the dynamometer car, the record sheet moves along and the distance recording instrument operates to record unit intervals of distance while the time recorder indicates thereon the unit intervals of time.

One of the important features of my invention consists in the design of the recording instrument so that the magnet pull retracts the ratchet pawl 59 and the spring 47 operates to rotate the pawl 59, which being in engagement with one of the notches of the ratchet wheel 54, in turn rotates the table 50 and the ratchet wheels 53 and 54. The armature 43 is stopped in its movement by the adjusting screw 48 and at this point, the holding pawl 60 is adapted to drop into a notch of the wheel 54. The pawl 60 therefore operates to hold the ratchet wheels against movement while the pawl 59 is being retracted by the operation of the magnet 42. The rotation of the ratchet wheels is thus effected by the substantially uniform and constant force of a spring and variations in the electric current will therefore not effect the accuracy of the movement nor will the sometimes too violent action of the magnet in pulling its armature have any harmful effect on the instrument.

Having now described my invention, what I claim as new and desire to secure by Letters Patent, is:—

1. A recording instrument comprising a ratchet wheel provided with teeth, a pawl for engaging said wheel, an electro-magnet, a spring, an armature subject to the opposing forces of the electro-magnet and said spring for operating said pawl, a second ratchet wheel driven by and having teeth equal in number to those of the first ratchet wheel, a pawl adapted to be reciprocated by engagement with the teeth of the second ratchet wheel, and a recording arm operated by said pawl.

2. A recording instrument comprising an electro-magnet, a rotatable ratchet wheel controlled by said magnet, a recording mechanism, a pawl operatively connected to said recording mechanism, a second ratchet wheel provided with teeth for operating said recording pawl, periodical notches formed by the teeth in said wheel being made deeper than the other notches, to effect an increased movement of the recording pawl at predetermined intervals.

3. A recording instrument comprising an operating ratchet wheel provided with teeth, a pawl for engaging said teeth, a spring acting on said pawl for rotating the same and thereby the ratchet wheel, an electro-magnet, an armature actuated by said magnet for retracting said pawl against the resistance of the spring, a recording ratchet wheel provided with teeth, a recording mechanism, and a reciprocating ratchet pawl operated by the movement of the recording ratchet wheel from tooth to tooth for effecting the movement of said recording mechanism.

In testimony whereof I have hereunto set my hand.

ISAAC SIMPSON.

Witnesses:
A. M. CLEMENTS,
S. W. KEEFER.

Copies of this patent may be obtained for five cents each, by addressing the "Commissioner of Patents, Washington, D. C."